United States Patent
Kazama

(10) Patent No.: US 9,424,377 B2
(45) Date of Patent: Aug. 23, 2016

(54) SIMULATION METHOD AND SIMULATION DEVICE

(71) Applicant: FUJITSU LIMITED, Kawasaki-shi, Kanagawa (JP)

(72) Inventor: Masaki Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 450 days.

(21) Appl. No.: 14/080,194

(22) Filed: Nov. 14, 2013

(65) Prior Publication Data

US 2014/0214377 A1    Jul. 31, 2014

(30) Foreign Application Priority Data

Jan. 30, 2013 (JP) .................................. 2013-016206

(51) Int. Cl.
*G06F 17/50* (2006.01)

(52) U.S. Cl.
CPC ....... *G06F 17/5009* (2013.01); *G06F 2217/16* (2013.01)

(58) Field of Classification Search
USPC ........................................................ 703/2, 9
See application file for complete search history.

(56) References Cited

U.S. PATENT DOCUMENTS

| | | | | |
|---|---|---|---|---|
| 8,577,659 B2 * | 11/2013 | Kim | ..................... | G06F 17/5009 703/6 |
| 2012/0053908 A1 * | 3/2012 | Kim | ..................... | G06F 17/5009 703/2 |
| 2015/0242545 A1 * | 8/2015 | Cho | ........................ | G06F 17/13 703/2 |

FOREIGN PATENT DOCUMENTS

| JP | 2010-170309 | 8/2010 |
|---|---|---|
| JP | 2010-184365 | 8/2010 |

OTHER PUBLICATIONS

"Extension of SPH to predict feeding freezing and defect creation in low pressure die casting", Applied Mathematical Modelling, 34(2010), pp. 3189-3201.
"Numerical Analysis of Breaking Waves Using the Moving Particle Semi-implicit Method", Int. J. Numer. Meth. Fluids, 26, 751-769. (1998).

* cited by examiner

*Primary Examiner* — Thai Phan
(74) *Attorney, Agent, or Firm* — Staas & Halsey LLP

(57) ABSTRACT

A state of a particle which was in a liquid state at a first time is calculated at a second time after the first time when a continuum including a liquid and a solid is represented by the plurality of particles. It is determined whether the particle has become a first solid particle at the second time. The first solid particle and all particles belonging to a solid which includes a second solid particle arranged in a predetermined range from the first solid particle are defined as particles belonging to the same solid when it is determined that the particle which was in the liquid state at the first time has become the first solid particle at the second time. The state of each of the particles belonging to the same solid is calculated using an equation of motion of a rigid body.

5 Claims, 12 Drawing Sheets

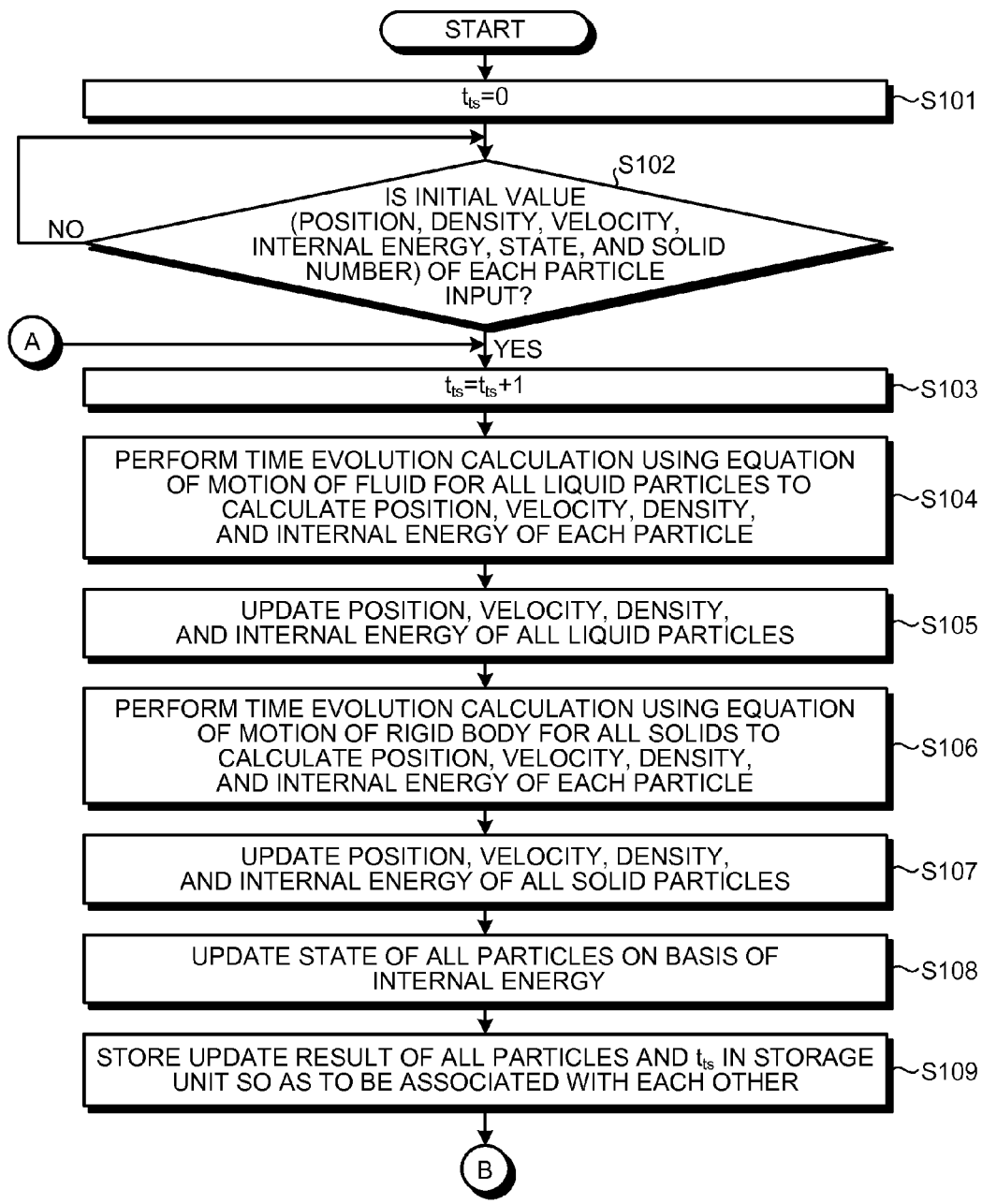

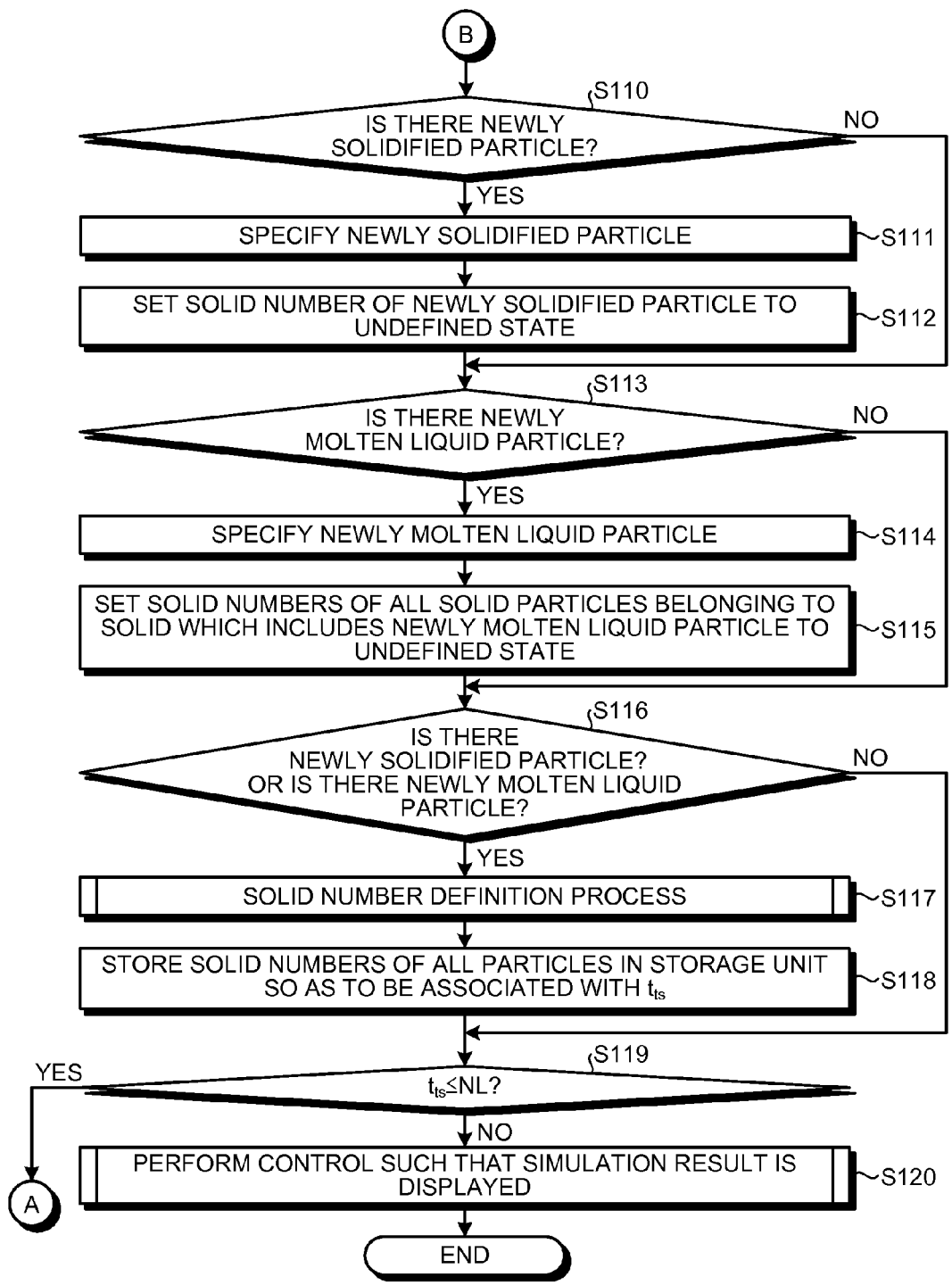

SIMULATION METHOD AND SIMULATION DEVICE

CROSS-REFERENCE TO RELATED APPLICATION(S)

This application is based upon and claims the benefit of priority of the prior Japanese Patent Application No. 2013-016206, filed on Jan. 30, 2013, the entire contents of which are incorporated herein by reference.

FIELD

The embodiments discussed herein are related to a simulation method and a simulation device.

BACKGROUND

As a numerical calculation method of calculating the motion of a continuum such as a fluid or an elastic body, for example, a finite difference method, a finite element method, or a finite volume method has been used which finds the approximate solution of a differential equation on the basis of the numerical mesh. In addition, in recent years, since numerical calculation has been used in the field of application such as computer aided engineering (CAE), the numerical calculation method of calculating the state of the continuum has been developed and the problem of the interaction between a fluid and a structure has been solved. However, in the numerical calculation method using the numerical mesh, when a moving boundary problem, such as the existence of an interface including a free surface or a problem in fluid-structure interaction analysis for analyzing the interaction between a fluid and a structure, occurs, handling of the continuum becomes complicated. Therefore, in some cases, it is difficult to create a program.

As the numerical calculation method without using the numerical mesh, there is a particle method. The particle method analyzes the motion of a continuum as the motion of a finite number of particles. A representative particle method which is currently proposed is, for example, a smoothed particles hydrodynamics (SPH) method or a moving particles semi-implicit (MPS) method. The particle method can analyze the motion of the continuum without a special measure in the treatment of the moving boundary. Therefore, in recent years, the particle method has been widely used as the numerical calculation method of calculating the motion of the continuum.

In particular, in the pressing of metal such as casting or forging, metal is processed through a complicated process. For example, metal (solidified metal) which is cooled and solidified is mixed with liquid metal, the solidified metal is grown, and the volume of metal is changed in the solidification process. The particle method is expected to be actively used in casting and forging simulations since the particle method has the advantage that it is easy to treat the free surface, it is relatively easy to calculate a parallel performance and interaction with a solid, or the like.

Cleary method has been known as a method of calculating a process (solidification process) in which a liquid is cooled and solidified, which is a basic technique for simulating a casting process. The Cleary method calculates the time evolution of the internal energy of each liquid particle using the SPH method which is one of the particle methods and calculates the temperature, density, and viscosity coefficient of the liquid particle as a function of internal energy. That is, when the internal energy is reduced and the temperature is lowered, the Cleary method increases the viscosity coefficient of the liquid to represent solidification and increases the density of the liquid to represent a reduction in volume due to solidification.

The Cleary method discretizes the equation of a fluid using the SPH method as represented by the following Expressions (1) to (4):

$$\frac{d\rho_i}{dt} = \sum_j m_j (v_i - v_j) \cdot \frac{\partial W(|x_i - x_j|)}{\partial x_i} \quad (1)$$

$$\frac{dv_i}{dt} = \quad (2)$$

$$g - \sum_j m_j \left[ \left( \frac{\rho_j + \rho_i}{\rho_j \rho_i} \right) - \frac{\xi}{\rho_j \rho_i} \frac{4\mu_i \mu_j}{(\mu_i + \mu_j)} \frac{v_{ij} \cdot x_{ij}}{|x_{ij}|^2 + \eta^2} \right] \frac{\partial W(|x_i - x_j|)}{\partial x_i}$$

$$p_i = P_0 \left[ \left( \frac{\rho_i}{\rho_{s,i}} \right)^\gamma - 1 \right] \quad (3)$$

$$\frac{dU_i}{dt} = \sum_j \frac{4m_j}{\rho_j \rho_i} \frac{k_i k_j}{(k_i + k_j)} \frac{x_{ij}}{|x_{ij}|^2 + \eta^2} \cdot \frac{\partial W(|x_i - x_j|)}{\partial x_i} \quad (4)$$

Expression (1) indicates the law of conservation of mass, Expression (2) indicates the law of conservation of momentum, Expression (3) indicates a state equation, and Expression (4) indicates the law of conservation of energy. In Expressions (1) to (4), $x_i$, $v_i$, $\rho_i$, $m_i$, $p_i$, and $U_i$ are the position vector of a particle i, the velocity vector of the particle i, the density of the particle i, the mass of the particle i, the pressure of the particle i, and the internal energy of the particle i, respectively. In addition, $x_{ij}$ and $v_{ij}$ are the relative position vector and relative velocity vector of particles i and j, respectively, and $x_{ij}=x_i-x_j$ and $v_{ij}=v_i-v_j$ are established. Furthermore, $\kappa_i$ and $\mu_i$ are the thermal conductivity of the particle i and the viscosity coefficient of the particle i, respectively. In addition, $P_0=\rho_0 c^2$ is established and c is the speed of sound. Further, $\rho_{s,i}$ is the reference density of the particle i and pressure is 0 when $\rho_i=\rho_{s,i}$ is established.

In addition, W is a kernel function and, for example, a spline function represented by the following Expression (5) is used as W.

$$W(r, h) = \begin{cases} \left(1 - 1.5\left(\frac{r}{h}\right)^2 + 0.75\left(\frac{r}{h}\right)^3\right)/\beta & 0 \leq \frac{r}{h} \leq 1, \\ 0.25\left(2 - \frac{r}{h}\right)^3/\beta & 1 \leq \frac{r}{h} \leq 2, \\ 0 & 2 \leq \frac{r}{h}. \end{cases} \quad (5)$$

In Expression (5), h is an influence radius between particles. For example, as h, a value that is about two to three times that the average distance between the particles in the initial state is used. In addition, β is a value which is adjusted such that the entire space integration amount of the kernel function is 1. In the case of two dimensions, β is set to 0.7 $\pi h^2$. In the case of three dimensions, β is set to $\pi h^3$.

In the Cleary method, when the internal energy is reduced and the temperature is lower than a melting point, the viscosity coefficient $\mu_i$ is increased and the effect of canceling the relative velocity between the particles represented by the third term of Expression (2) is improved. Therefore, it is difficult to deform by the third term. In this way, the Cleary method represents solidification. In addition, in the Cleary method, when the reference density $\rho_{s,i}$ increases, pressure is reduced and the surrounding particles are collected by the effect of the second term of Expression (2). In this way, the Cleary method represents contraction due to solidification.

It is possible to perform a simulation by calculating the time evolution of Expressions (1) to (4) using the Euler's method or the Leapfrog method which is a general ordinary differential equation.

In the Cleary method, since the value of the viscosity coefficient increases in the solidification process, a time step is very small in calculation. Therefore, the number of calculation operations increases until calculation ends. As a result, the Cleary method has a long calculation time.

As an example of a method of calculating the interaction between a fluid and a rigid body, there is a method which uses the equation of motion of a liquid for a liquid portion and uses the equation of motion of a rigid body for a solid portion. In the method, since the motion of the solid portion is calculated by the equation of motion of a rigid body, the calculation time is shorter than that in the Cleary method.

As to the conventional techniques, refer to Paul W. Cleary, "Extension of SPH to predict feeding freezing and defect creation in low pressure die casting", Applied Mathematical Modeling, 34 (2010), pp. 3189-3201; and Koshizuka, S., Nobe A. and Oka Y. "Numerical Analysis of Breaking Waves Using the Moving Particle Semi-implicit Method", Int. J. Numer. Meth. Fluids, 26, 751-769 (1998), for example.

However, in the method which uses the equation of motion of a rigid body for the solid portion, the accuracy of the calculation result is not high in a situation in which a new solid is generated from a liquid. For example, a case in which liquid metal is poured into a mold and then cooled will be described. In this case, a plurality of portions of the liquid metal starts to be solidified depending on the cooling conditions and the volume of the plurality of solidified portions increases over time. Then, the entire liquid metal is solidified. FIG. 14 is a diagram illustrating an example of the problems of the method according to the related art. In the example illustrated in FIG. 14, particles 90a of a solid portion 90, particles 91a of a solid portion 91, and particles 92a of a liquid portion 92 in the metal which is solidified by cooling are present in a mold. In this case, even when the solidified volume of the solid portion 90 is increased, the liquid portion 92 is solidified, and the solidified portion 92 and the solid portion 90 form the same solid by cooling, the above-mentioned method treats the solidified portion 92 and the solid portion 90 as individual solids. That is, the above-mentioned method separately calculates the motion of the solidified portion 92 and the motion of the solid portion 90 using the equation of motion of a rigid body. Therefore, the above-mentioned method separately calculates the motions of a plurality of solids even though there is originally one solid. As a result, the accuracy of the calculation result is not high.

SUMMARY

According to an aspect of an embodiment, a simulation method causes a computer to perform: calculating a state of a particle which was in a liquid state at a first time among a plurality of particles at a second time after the first time when a continuum including a liquid and a solid is represented by the plurality of particles; determining whether the particle which was in the liquid state at the first time has become a first solid particle at the second time on the basis of the state of the particle at the second time; defining the first solid particle and all particles belonging to a solid which includes a second solid particle arranged in a predetermined range from the first solid particle as particles belonging to the same solid when it is determined that the particle which was in the liquid state at the first time has become the first solid particle at the second time; and calculating the state of each of the particles belonging to the same solid using an equation of motion of a rigid body.

According to another aspect of an embodiment, a simulation device includes a calculation unit, a determination unit, and a definition unit. The calculation unit calculates a state of a particle which was a liquid state at a first time among a plurality of particles at a second time after the first time when a continuum including a liquid and a solid is represented by the plurality of particles, and calculates the state of each particle belonging to the defined same solid using an equation of motion of a rigid body. The determination unit determines whether the particle which was in the liquid state at the first time has become a first solid particle at the second time on the basis of the state of the particle at the second time. The definition unit defines the first solid particle and all particles belonging to a solid which includes a second solid particle arranged in a predetermined range from the first solid particle as particles belonging to the same solid when it is determined that the particle which was in the liquid state at the first time has become the first solid particle at the second time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 11A and 11B are flowcharts illustrating the procedure of a simulation process according to the embodiment;

DESCRIPTION OF EMBODIMENTS

Preferred embodiments of the present invention will be explained with reference to accompanying drawings. The embodiments do not limit the disclosed technique.

Structure of Simulation Device

Figure 1:
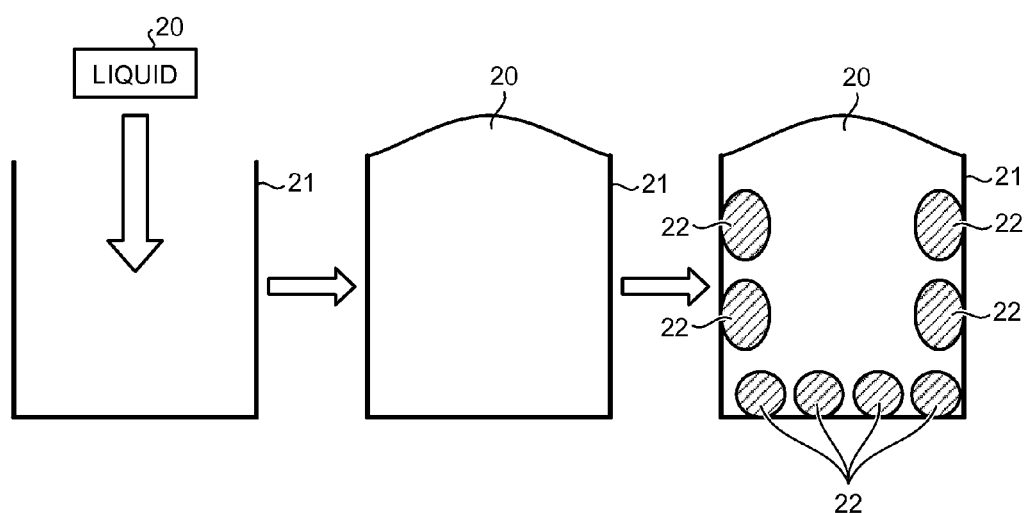
FIG. 1 is a diagram illustrating an example of a process performed by a simulation device according to an embodiment.

The simulation device according to the embodiment will be described. The simulation device according to this embodiment calculates the state of each particle of a continuum including a metallic liquid and a metallic solid at each time step $t_{ts}$ using a particle method, according to a scenario which pours the metallic liquid into a mold and cools the metallic liquid. FIG. 1 is a diagram illustrating an example of a process performed by the simulation device according to the embodiment. As illustrated in FIG. 1, the simulation device pours a metallic liquid 20 into a mold 21, cools the metallic liquid 20, and calculates the state of each particle when the metallic liquid 20 and a metallic solid 22, which is a solidified metallic liquid 20, are mixed with each other using the particle method.

Figure 2:
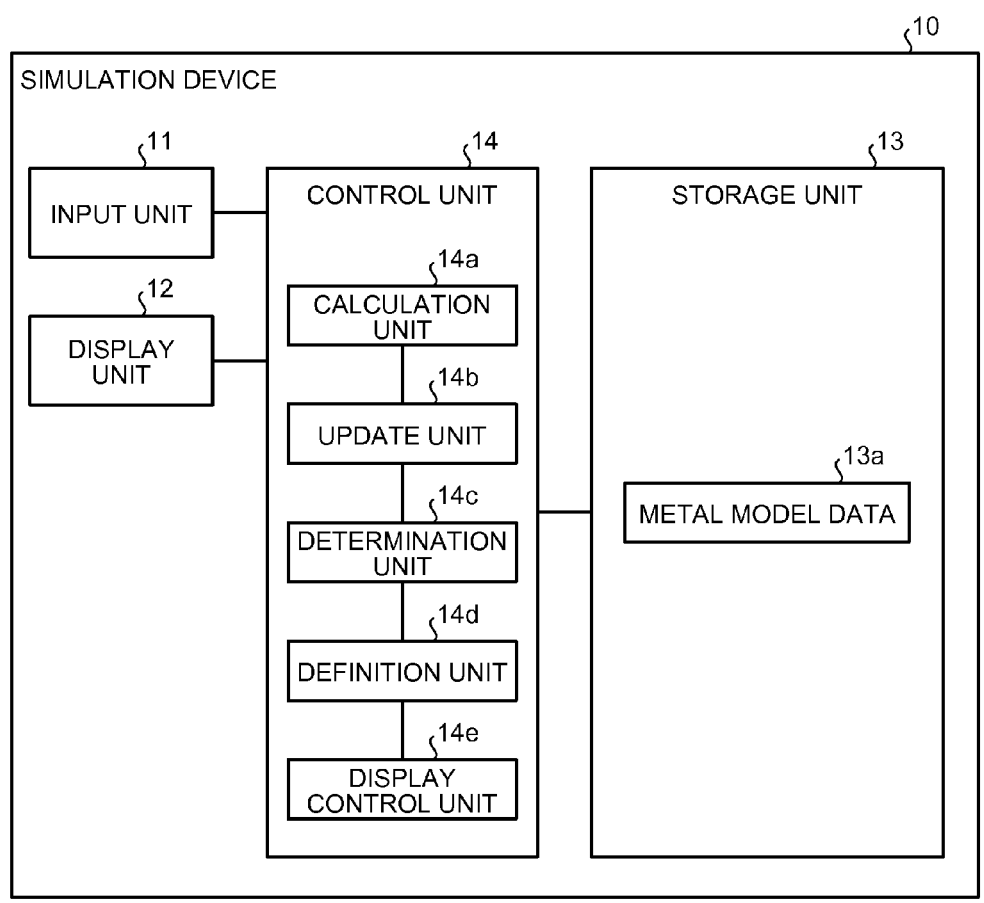
FIG. 2 is a diagram illustrating an example of the functional structure of the simulation device according to the embodiment.

FIG. 2 is a diagram illustrating an example of the functional structure of the simulation device according to the embodiment. As illustrated in FIG. 2, a simulation device 10 includes an input unit 11, a display unit 12, a storage unit 13, and a control unit 14.

The input unit 11 inputs information to the control unit 14. For example, the input unit 11 receives a simulation execution instruction to perform a simulation process, which will be described below, from the user and inputs the received simulation execution instruction to the control unit 14. In addition, the input unit 11 receives the initial value of each particle in an initial state from the user and inputs the received initial value of each particle to the control unit 14. The initial value of each particle in the initial state includes the position, density, velocity, internal energy, state, and solid number of each particle. When the internal energy is greater than a predetermined value and the temperature is higher than a melting point, the particle is a liquid. Therefore, information indicating that the particle is a liquid is set to the state of the particle. In addition, when the internal energy is equal to or less than the predetermined value and the temperature is lower than a solidifying point, the particle is a solid. Therefore, information indicating that the particle is a sold is set to the state of the particle. An identification number of the solid including the particle is set to the solid number. An exemplary device of the input unit 11 is a keyboard or a mouse.

The display unit 12 displays various kinds of information. For example, the display unit 12 displays a simulation result under the control of a display control unit 14e, which will be described below. An exemplary device of the display unit 12 is a liquid crystal display.

Figure 3:
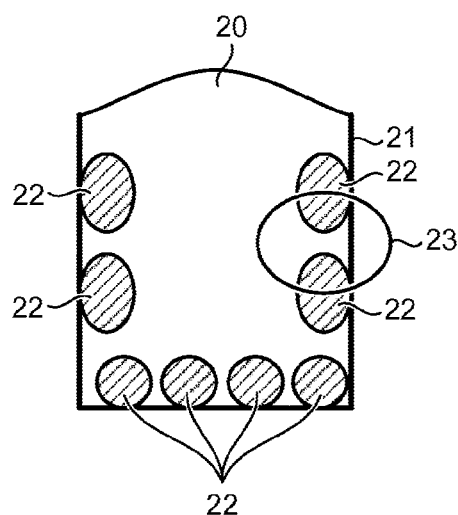
FIG. 3 is a diagram illustrating an example of a metal model indicated by metal model data.
Figure 4:
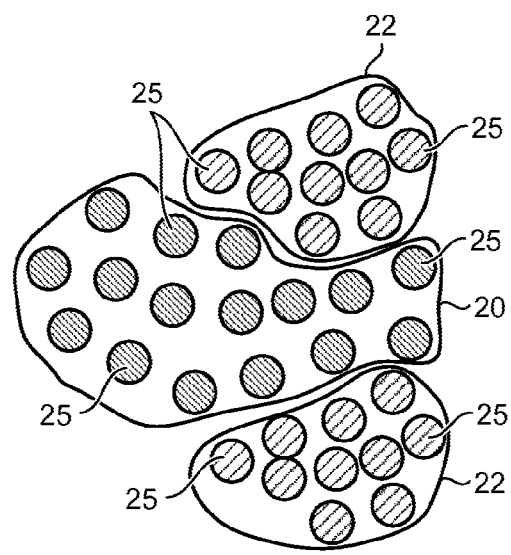
FIG. 4 is a diagram illustrating an example of the metal model indicated by the metal model data.

The storage unit 13 stores various programs executed by the control unit 14. In addition, the storage unit 13 stores metal model data 13a. The metal model data 13a indicates a metal model in which a continuum including a metallic liquid and a metallic solid is represented as a plurality of particles. FIGS. 3 and 4 are diagrams illustrating an example of the metal model indicated by the metal model data. In the example illustrated in FIG. 3, a portion of the metallic liquid 20 poured into the mold 21 is solidified, and the metallic liquid 20 and the metallic solid 22 are mixed with each other. The metal model of a portion 23 illustrated in FIG. 3 will be described in detail. FIG. 4 is a diagram illustrating details of the metal model of the portion 23 illustrated in FIG. 3. As illustrated in the example of FIG. 4, the model of the metallic liquid 20 and the metallic solid 22 includes a plurality of particles 25. In this embodiment, the position, density, velocity, internal energy, state, and solid number of each particle 25 are calculated at each time step $t_{ts}$.

Returning to FIG. 1, the storage unit 13 is a semiconductor memory device such as a flash memory, or a storage device such as a hard disk or an optical disk. The storage unit 13 is not limited to the above types of storage devices, but may be a random access memory (RAM) or a read only memory (ROM).

The control unit 14 includes an internal memory for storing a program or control data which defines various types of procedures, and various types of processes are performed by the program or control data. As illustrated in FIG. 2, the control unit 14 includes a calculation unit 14a, an update unit 14b, a determination unit 14c, a definition unit 14d, and the display control unit 14e.

The calculation unit 14a calculates various kinds of information. For example, the calculation unit 14a performs time evolution calculation using the equation of motion of a fluid for a liquid particle, which is a particle in a liquid state, at each time step $t_{ts}$ to calculate the position, velocity, density, and internal energy of the liquid particle. For example, the calculation unit 14a calculates the position, velocity, density, and internal energy of all particles, which were in the liquid state at a time step $(t_{ts}-1)$, at the time step $t_{ts}$ using the above-mentioned Expressions (1) to (4).

The calculation unit 14a performs time evolution calculation using the equation of motion of a rigid body for a solid including a solid particle, which is a particle in a solid state, at each time step $t_{ts}$ to calculate the position, velocity, density, and internal energy of the solid particle. For example, the calculation unit 14a calculates the translation motion of the gravity center of the particle, which is in the solid state at the time step $(t_{ts}-1)$, and the rotational motion of the solid particle about the gravity center at the time step $t_{ts}$. In this way, the calculation unit 14a calculates the time evolution of the solid including solid particles at the time step $t_{ts}$. That is, the calculation unit 14a calculates the translation motion of the gravity center of each solid and the rotational motion of the solid about the gravity center at the time step $t_{ts}$ from the force applied to the solid particles in each solid. Then, the calculation unit 14a calculates the position, velocity, and density of the solid particles in each solid at the time step $t_{ts}$ from the calculated translation motion of the gravity center of the solid and the calculated rotational motion of the solid about the gravity center, using the equation of motion of a rigid body. In addition, the calculation unit 14a calculates the internal energy of the solid particles at the time step $t_{ts}$ using the above-mentioned Expression (4).

An aspect of the calculation unit 14a will be described. For example, when the simulation execution instruction is input from the input unit 11, first, the calculation unit 14a sets the value of the time step $t_{ts}$ to 0. Then, the calculation unit 14a determines whether the initial value of each particle is input from the input unit 11. When the initial value is input, the calculation unit 14a increases the value of the time step $t_{ts}$ by 1. In addition, when the display control unit 14e determines that the value of the time step $t_{ts}$ is equal to or less than the last time step $N_L$ of the simulation, the calculation unit 14a increases the value of the time step $t_{ts}$ by 1.

Then, the calculation unit 14a calculates the position, velocity, density, and internal energy of all particles, which were in the liquid state at the time step ($t_{ts}$−1), at the time step $t_{ts}$ using the above-mentioned Expressions (1) to (4).

In addition, the calculation unit 14a performs time evolution calculation using the equation of motion of a rigid body for all solids including the particles which are in the solid state at the time step ($t_{ts}$−1) and performs the next process. That is, the calculation unit 14a calculates the position, velocity, density, and internal energy of all particles, which were in the solid state at the time step ($t_{ts}$−1), at the time step $t_{ts}$.

The update unit 14b updates various kinds of information. An aspect of the update unit 14b will be described. For example, the update unit 14b updates the position, velocity, density, and internal energy of all particles which were in the liquid state at the time step ($t_{ts}$−1) to the calculated position, velocity, density, and internal energy of the liquid particles at the time step $t_{ts}$, respectively.

In addition, the update unit 14b updates the position, velocity, density, and internal energy of all particles which were in a solid state at the time step ($t_{ts}$−1) to the calculated position, velocity, density, and internal energy of the solid particles at the time step $t_{ts}$, respectively.

Then, the update unit 14b updates the state of all particles on the basis of the calculated internal energy. For example, when the calculated internal energy is greater than a predetermined value, the update unit 14b sets information indicating that the particle is a liquid to the state of particles to update the state. When the internal energy is equal to or less than the predetermined value, the update unit 14b sets information indicating that the particle is a solid to the state of particles to update the state.

Then, the update unit 14b stores the update result (the position, velocity, density, internal energy, and state) of all particles in a predetermined area of the storage unit 13 so as to be associated with the time step $t_{ts}$.

Then, the determination unit 14c performs various determination operations. An aspect of the determination unit 14c will be described. For example, the determination unit 14c determines whether there is a newly solidified particle (a particle whose state has been changed from a liquid to a solid) on the basis of the states of all particles at the time step $t_{ts}$ before and after the update.

When there is a newly solidified particle, the determination unit 14c specifies the newly solidified particle. Then, the determination unit 14c sets the solid number of the specified solid particle to an undefined state.

The determination unit 14c determines whether there is a newly molten liquid particle (a particle whose state has been changed from a solid to a liquid) on the basis of the states of all particles at the time step $t_{ts}$ before and after the update.

When there is a newly molten liquid particle, the determination unit 14c specifies the newly molten liquid particle. Then, the determination unit 14c sets the solid numbers of all solid particles included in the solid when the specified liquid particle has been a solid particle at the time step ($t_{ts}$−1) to an undefined state.

Then, the determination unit 14c determines whether there is a newly solidified particle and there is a newly molten liquid particle on the basis of the states of all particles at the time step $t_{ts}$ before and after the update.

The definition unit 14d defines various kinds of information. An aspect of the definition unit 14d will be described. For example, when the determination unit 14c determines that there is a newly solidified particle or determines that there is a newly molten liquid particle, the definition unit 14d performs the next process. That is, the definition unit 14d determines whether there is a solid particle which has not been selected among the solid particles with the undefined solid numbers.

When there is a solid particle which has not been selected, the definition unit 14d selects one of the solid particles which have not been selected and have the undefined solid numbers. Then, the definition unit 14d determines whether a solid particle belonging to a solid is present in a sphere with a radius h which has the selected solid particle as its center. As an example of a method of determining the solid particles belonging to a solid, there is a method which determines whether solid identification numbers are set to the solid numbers of the solid particles in the sphere. In the method, when the identification number is set, it is determined that the solid particle belongs to a solid. When the identification number is not set, it is determined that the solid particle does not belong to a solid. In addition, the radius h may have any value. For example, the influence radius of a particle in the particle method can be used.

Figure 5:
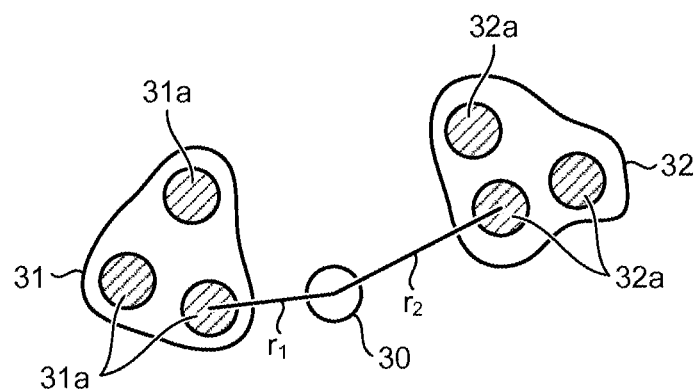
FIG. 5 is a diagram illustrating an example of the process performed by the simulation device according to the embodiment.
Figure 6:
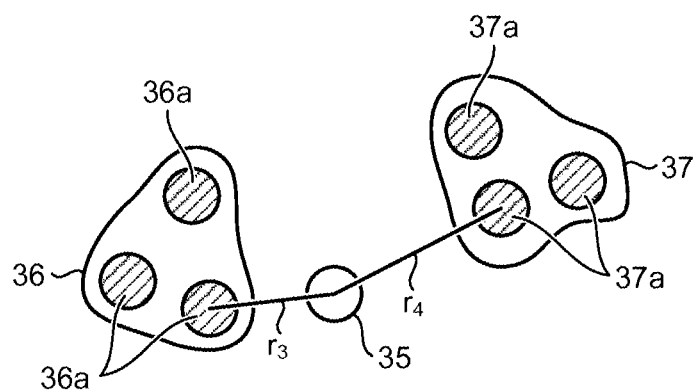
FIG. 6 is a diagram illustrating an example of the process performed by the simulation device according to the embodiment.
Figure 7:
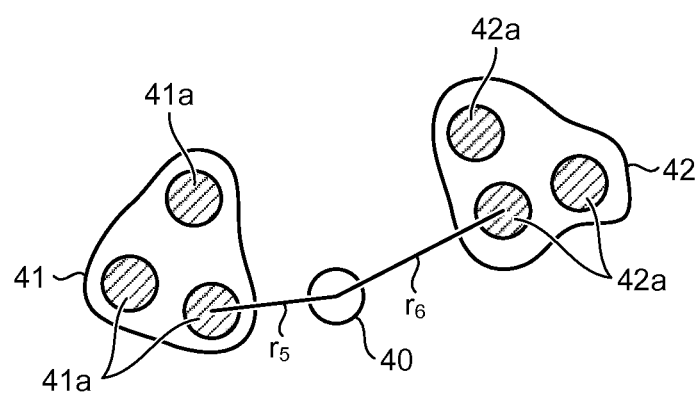
FIG. 7 is a diagram illustrating an example of the process performed by the simulation device according to the embodiment.

FIGS. 5 to 7 are diagrams illustrating an example of the process performed by the simulation device according to the embodiment. In the example illustrated in FIG. 5, the definition unit 14d selects a solid particle 30 with an undefined solid number. In addition, in the example illustrated in FIG. 5, the distance between the solid particle 30 and a solid particle 31a closest to the solid particle 30 among the solid particles 31a belonging to a solid 31 is $r_1$. In the example illustrated in FIG. 5, the distance between the solid particle 30 and a solid particle 32a closest to the solid particle 30 among the solid particles 32a belonging to a solid 32 is $r_2$. In the example illustrated in FIG. 5, $r_1$ and $r_2$ are both greater than the radius h. In the example illustrated in FIG. 5, the definition unit 14d determines that a solid particle belonging to a solid is absent in the sphere with the radius h which has the selected solid particle 30 as its center.

In the example illustrated in FIG. 6, the definition unit 14d selects a solid particle 35 with an undefined solid number. In the example illustrated in FIG. 6, the distance between the solid particle 35 and a solid particle 36a closest to the solid particle 35 among the solid particles 36a belonging to a solid 36 is $r_3$. In the example illustrated in FIG. 6, the distance between the solid particle 35 and a solid particle 37a closest to the solid particle 35 among the solid particles 37a belonging to a solid 37 is $r_4$. In the example illustrated in FIG. 6, $r_3$ is equal to or less than the radius h and $r_4$ is greater than the radius h. In the example illustrated in FIG. 6, the definition unit 14d determines whether the solid particle 36a belonging to the solid 36 is present in the sphere with the radius h which has the selected solid particle 35 as its center.

In the example illustrated in FIG. 7, the definition unit 14d selects a solid particle 40 with an undefined solid number. In the example illustrated in FIG. 7, the distance between the solid particle 40 and a solid particle 41a closest to the solid particle 40 among the solid particles 41a belonging to a solid 41 is $r_5$. In the example illustrated in FIG. 7, the distance between the solid particle 40 and a solid particle 42a closest to the solid particle 40 among the solid particles 42a belonging to a solid 42 is $r_6$. In the example illustrated in FIG. 7, $r_5$ and $r_6$ both are equal to or less than the radius h. In the example illustrated in FIG. 7, the definition unit 14d determines that the solid particle 41a and the solid particle 42a which respectively belong to a plurality of solids 41 and 42 are present in the sphere with the radius h which has the selected solid particle 40 as its center.

When there is a solid particle, the definition unit 14d determines whether the solid particle which is determined to be present belongs to each of the plurality of solids. For example, in the example illustrated in FIG. 6, the definition unit 14d determines that the solid particle which is determined to be present does not belong to any one of the plurality of solids. In the example illustrated in FIG. 7, the definition unit 14d determines that the solid particle which is determined to be present belongs to each of the plurality of solids.

When the solid particle which is determined to be present does not belong to any one of the plurality of solids, the definition unit 14d sets the value of the solid number of the solid particle in the sphere to the solid number of the selected solid particle. For example, in the example illustrated in FIG. 6, the definition unit 14d sets the value of the solid number '36' of the solid particle in the sphere to the solid number of the selected solid particle 35. In this way, the particle belonging to one solid is defined so as to belong to one solid.

On the other hand, when the solid particle which is determined to be present belongs to each of the plurality of solids, the definition unit 14d sets the value of the solid number of the solid particle which is closest to the selected solid particle among a plurality of solid particles in the sphere to the solid number of the selected solid particle. For example, in the example illustrated in FIG. 7, the definition unit 14d sets the value '41' of the solid number of the solid particle 41a which is closest to the selected solid particle 40 among the plurality of solid particles 41a and 42a in the sphere to the solid number of the selected solid particle 40. In this way, the particle belonging to one solid is defined so as to belong to one solid.

The definition unit 14d specifies the solid particle with a solid number to which a value other than the value of the solid number set to the selected solid particle is set, among the plurality of solid particles in the sphere. For example, in the example illustrated in FIG. 7, the definition unit 14d specifies the solid particle 42a with a solid number to which a value '42' other than the value '41' of the solid number set to the selected solid particle is set, among the plurality of solid particles 41a and 42a in the sphere.

Then, the definition unit 14d updates the values of the solid numbers of all solid particles belonging to the solid including the specified solid particle to the value set to the solid number of the selected solid particle. For example, in the example illustrated in FIG. 7, the definition unit 14d updates the values of the solid numbers of all solid particles 42a (three solid particles 42a) belonging to the solid 42 including the specified solid particle 42a to the value '41' set to the solid number of the selected solid particle 40. In this way, the solid particles belonging to a plurality of solids are defined so as to belong to one solid through the selected solid particle.

When a solid particle belonging to a solid is absent in the sphere with the radius h which has the selected solid particle as its center, the definition unit 14d sets, to the solid number of the selected solid particle, a value which does not overlap the values of the solid numbers of the other solid particles. For example, in the example illustrated in FIG. 5, the definition unit 14d sets, to the solid number of the selected solid particle 30, a value '50' which does not overlap the values of the solid numbers of the other solid particles.

Then, the definition unit 14d performs the process subsequent to the process of determining whether there is a solid particle which has not been selected among the solid particles with the undefined solid numbers again. Therefore, the definition unit 14d can set the solid numbers of all solid particles with the undefined solid numbers. Then, when there is no solid particle which has not been selected among the solid particles with the undefined solid numbers, the definition unit 14d stores the solid numbers of all particles in the storage unit 13 so as to be associated with the time step $t_{ts}$.

Figure 8:
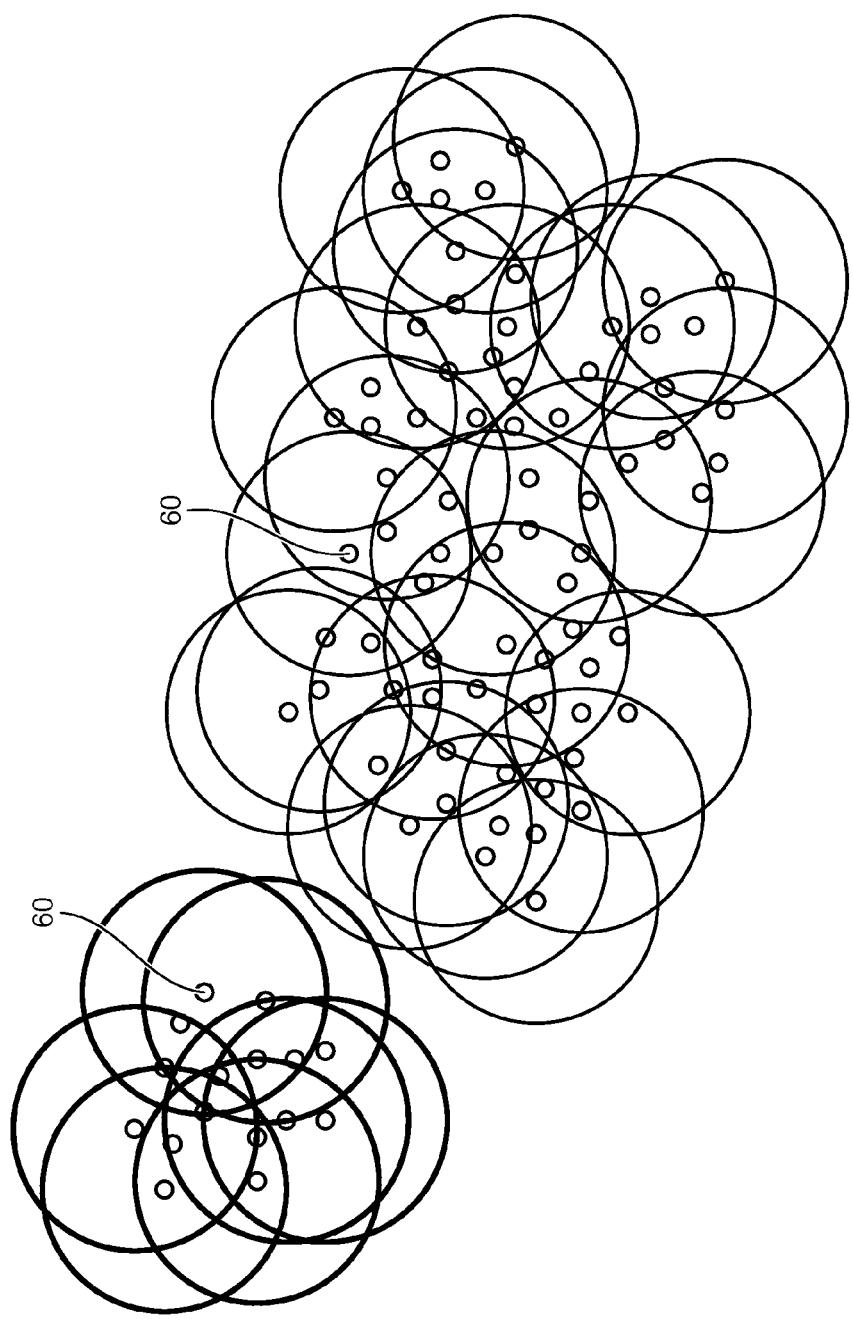
FIG. 8 is a diagram illustrating an example of the process performed by the simulation device according to the embodiment.
Figure 9:
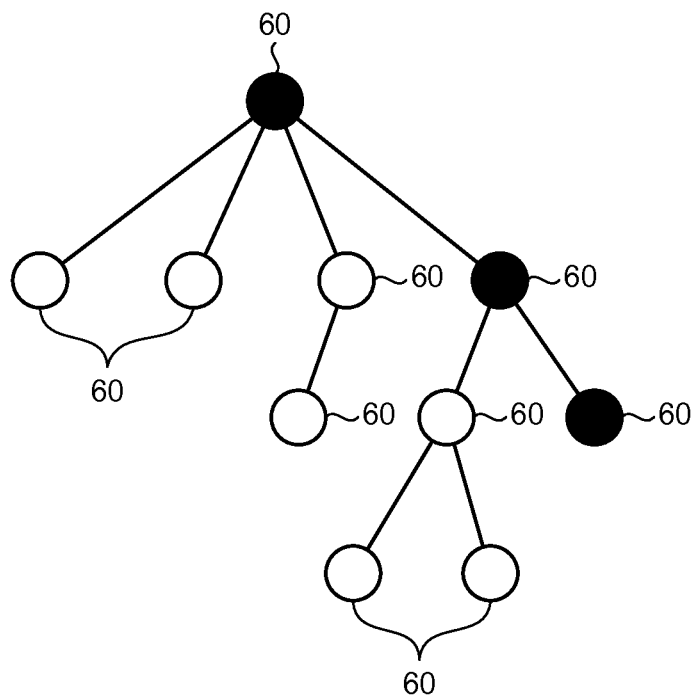
FIG. 9 is a diagram illustrating an example of the process performed by the simulation device according to the embodiment.
Figure 10:
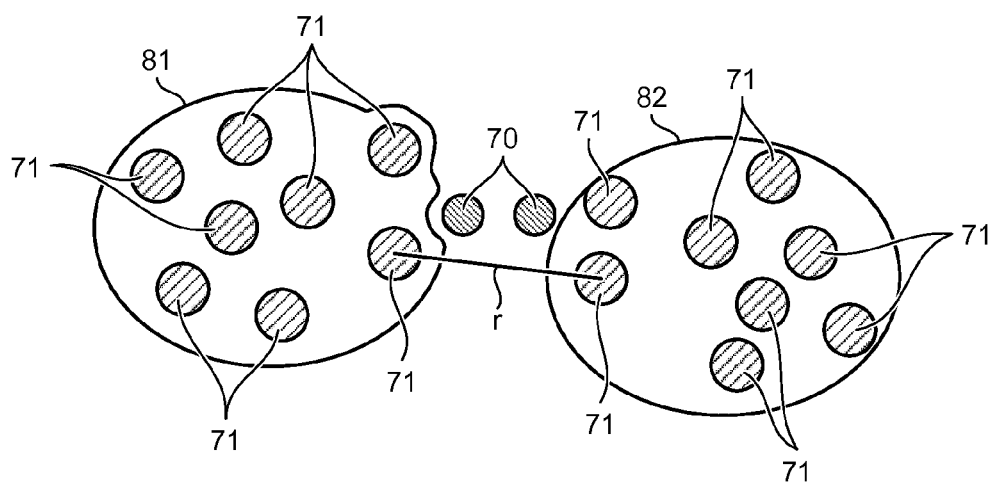
FIG. 10 is a diagram illustrating an example of the process performed by the simulation device according to the embodiment.

FIGS. 8 to 10 are diagrams illustrating an example of the process performed by the simulation device according to the embodiment. As illustrated in FIG. 8, the definition unit 14d traces particles 60 in the radius h to recognize the particles 60 belonging to the same solid, using the above-mentioned process. FIG. 9 illustrates a linked list indicating the connection relation between particles when the particles 60 in the radius h are connected.

In the example illustrated in FIG. 10, the solid numbers of all solid particles 71 belonging to the solid to which liquid particles 70, which have been newly melted at the time step $t_{ts}$, belonged as solid particles at the time step $(t_{ts}-1)$ are undefined and a new solid number is defined. In the example illustrated in FIG. 10, the solid number of each solid particle 71 is defined as '81' which is the solid number of a solid 81 or '82' which is the solid number of a solid 82. In the example illustrated in FIG. 10, since the shortest distance between the particle 71 in the solid 81 and the particle 71 in the solid 82 is r (>h), the particles 71 are defined such that they do not belong to one solid but belong to any one of two solids.

The display control unit 14e controls the display of various kinds of information. An aspect of the display control unit 14e will be described. For example, when the definition unit 14d stores the solid numbers of all particles in the storage unit 13 so as to be associated with the time step $t_{ts}$, the display control unit 14e determines whether the value of the time step $t_{ts}$ is equal to or less than the last time step $N_L$ of the simulation. When the value of the time step $t_{ts}$ is not equal to or less than the last time step $N_L$ of the simulation, the display control unit 14e performs the next process. That is, the display control unit 14e acquires the position, velocity, density, internal energy, state, and solid numbers of all particles, which are stored in the storage unit 13 of each time step, at all time steps. Then, the display control unit 14e controls the display of the display unit 12 such that the simulation result (the position, velocity, density, internal energy, state, and solid numbers of all particles at all time steps) is displayed.

The control unit 14 is a hard-wired logic, such as an application specific integrated circuit (ASIC) or a field programmable gate array (FPGA). Alternatively, a central processing unit (CPU) or a micro processing unit (MPU) executes a program to implement the function of the control unit 14.

Flow of Process

Next, the flow of the process performed by the simulation device 10 according to this embodiment will be described. FIGS. 11A and 11B are flowcharts illustrating the procedure of a simulation process according to the embodiment. The simulation process is performed at various times. For example, when a simulation execution instruction to perform the simulation process is input from the input unit 11, the simulation process is performed by the control unit 14.

As illustrated in FIGS. 11A and 11B, the calculation unit 14a sets the value of the time step $t_{ts}$ to 0 (S101). Then, the calculation unit 14a determines whether an initial value of each particle is input from the input unit 11 (S102). When the initial value is not input (No in step S102), the calculation unit 14a performs the determination in S102 again. On the other hand, when the initial value is input (Yes in step S102), the calculation unit 14a increases the value of the time step $t_{ts}$ by 1 (S103).

Then, the calculation unit 14a calculates the position, velocity, density, and internal energy of all particles, which have been in the liquid state at the time step ($t_{ts}$−1), at the time step $t_{ts}$ using the above-mentioned Expressions (1) to (4) (S104). Then, the update unit 14b updates the position, velocity, density, and internal energy of all particles which have been in the liquid state at the time step ($t_{ts}$−1) to the calculated position, velocity, density, and internal energy at the time step $t_{ts}$ (S105).

Then, the calculation unit 14a performs time evolution calculation using the equation of motion of a rigid body for all solids including the particles which have been in the solid state at the time step ($t_{ts}$−1) and performs the next process. That is, the calculation unit 14a calculates the position, velocity, density, and internal energy of all particles, which have been in the solid state at the time step ($t_{ts}$−1), at the time step $t_{ts}$ (S106).

Then, the update unit 14b updates the position, velocity, density, and internal energy of all particles which have been in the solid state at the time step ($t_{ts}$−1) to the calculated position, velocity, density, and internal energy at the time step $t_{ts}$, respectively (S107).

Then, the update unit 14b updates the state of all particles on the basis of the calculated internal energy (S108). Then, the update unit 14b stores the update result (the position, velocity, density, internal energy, and state) of all particles in a predetermined area of the storage unit 13 so as to be associated with the time step $t_{ts}$ (S109).

The determination unit 14c determines whether there is a newly solidified particle on the basis of the state of all particles at the time step $t_{ts}$ before and after the update (S110). When there is no newly solidified particle (No in step S110), the process proceeds to S113.

On the other hand, when there is a newly solidified particle (Yes in step S110), the determination unit 14c specifies the newly solidified particle (S111). Then, the determination unit 14c sets the solid number of the specified solid particle to an undefined state (S112).

Then, the determination unit 14c determines whether there is a newly molten liquid particle on the basis of the state of all particles at the time step $t_{ts}$ before and after the update (S113). When there is no newly molten liquid particle (No in step S113), the process proceeds to S116. On the other hand, when there is a newly molten liquid particle (Yes in step S113), the determination unit 14c specifies the newly molten liquid particle (S114). Then, the determination unit 14c sets the solid numbers of all solid particles belonging to the solid including the specified liquid particle which has been a solid particle at the time step ($t_{ts}$−1) to the undefined state (S115).

Then, the determination unit 14c determines whether there is a newly solidified particle and whether there is a newly molten liquid particle again, on the basis of the state of all particles at the time step $t_{ts}$ before and after the update (S116).

When there is no newly solidified particle and no newly molten liquid particle (No in step S116), the process proceeds to S119. On the other hand, when there is a newly solidified particle or there is a newly molten liquid particle (yes in step S116), the definition unit 14d performs the next process. That is, the definition unit 14d performs a solid number definition process (S117). Then, the definition unit 14d stores the solid numbers of all particles in the storage unit 13 so as to be associated with the time step $t_{ts}$ (S118).

Then, the display control unit 14e determines whether the value of the time step $t_{ts}$ is equal to or less than the last time step $N_L$ of the simulation (S119). When the value of the time step $t_{ts}$ is equal to or less than the last time step $N_L$ of the simulation (Yes in step S119), the process returns to S103. On the other hand, when the value of the time step $t_{ts}$ is not equal to or less than the last time step $N_L$ of the simulation (No in step S119), the display control unit 14e performs the next process. That is, the display control unit 14e acquires the position, velocity, density, internal energy, state, and solid numbers of all particles, which are stored in the storage unit 13 so as to be associated with each time step, at all time steps. Then, the display control unit 14e controls the display of the display unit 12 such that the simulation result (the position, velocity, density, internal energy, state, and solid numbers of all particles at all time steps) is displayed (S120) and the process ends.

Figure 12:
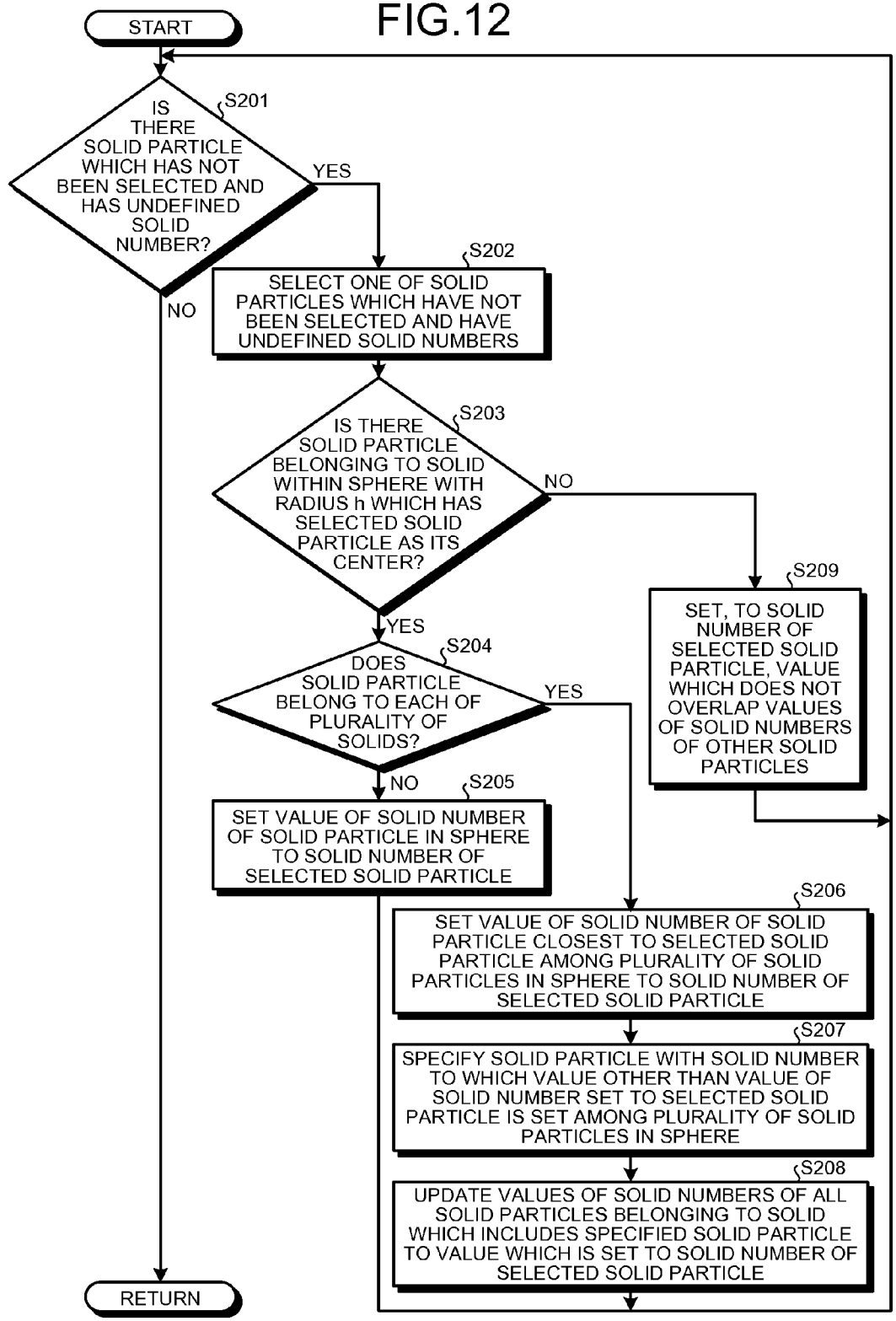
FIG. 12 is a flowchart illustrating the procedure of a solid number definition process according to the embodiment.

FIG. 12 is a flowchart illustrating the procedure of the solid number definition process according to the embodiment. As illustrated in FIG. 12, the definition unit 14d defines whether there is a solid particle which has not been selected among the solid particles with the undefined solid numbers (S201).

When there is a solid particle which has not been selected (Yes in step S201), the definition unit 14d selects one of the solid particles which have not been selected and have the undefined solid number (S202). Then, the definition unit 14d determines whether a solid particle belonging to a solid is present in a sphere with a radius h which has the selected solid particle as its center (S203).

When a solid particle is present in the sphere (Yes in step S203), the definition unit 14d determines whether the solid particle which is determined to be present belongs to each of a plurality of solids (S204).

When the solid particle which is determined to be present does not belong to any of the plurality of solids (No in step S204), the definition unit 14d sets the value of the solid number of the solid particle in the sphere to the solid number of the selected solid particle (S205) and the process returns to S201.

On the other hand, when the solid particle which is determined to be present belongs to each of the plurality of solids (yes in step S204), the definition unit 14d performs the next process. That is, the definition unit 14d sets the value of the solid number of the solid particle closest to the selected solid particle among the plurality of solid particles in the sphere to the solid number of the selected solid particle (S206).

Then, the definition unit 14d specifies the solid particle with a solid number to which a value other than the value of the solid number set to the selected solid particle is set, among the plurality of solid particles in the sphere (S207). Then, the definition unit 14d updates the values of the solid numbers of all solid particles belonging to the solid including the specified solid particle to the value which is set to the solid number of the selected solid particle (S208) and the process returns to S201.

When the solid particle belonging to the solid is absent in the sphere with the radius h which has the selected solid particle as its center (No in step S203), the definition unit 14d sets, to the solid number of the selected solid particle, a value which does not overlap the values of the solid numbers of the other solid particles (S209) and the process returns to S201.

When there is no solid particle which has not been selected among the solid particles with the undefined solid numbers (No in step S201), the definition unit 14d stores the processing result in the internal memory and returns to the process.

As described above, the simulation device 10 according to this embodiment performs the following process for a particle which is in a liquid state at the time step ($t_{ts}-1$) among a plurality of particles when metal in the liquid and solid states is represented as a plurality of particles. That is, the simulation device 10 calculates the state of the liquid particle at the time step $t_{ts}$ after the time step ($t_{ts}-1$). Then, the simulation device 10 determines whether the liquid particle at the time step ($t_{ts}-1$) has become the solid particle at the time step $t_{ts}$ on the basis of the calculated state. Then, when it is determined that the liquid particle at the time step ($t_{ts}-1$) has become the solid particle at the time step $t_{ts}$, the simulation device 10 performs the next process. That is, the simulation device 10 defines the solid particle and all particles belonging to the solid including the other solid particles in the sphere from the solid particle, as particles belonging to the same solid. Then, the simulation device 10 calculates the state of each particle belonging to the same solid using the equation of motion of a rigid body. The simulation device 10 of this embodiment defines the particle which has newly changed from a liquid to a solid and all particles belonging to the solid including the other solid particles in the sphere with the radius h, which has the changed particle as its center, as particles belonging to the same solid and performs the next process. That is, the simulation device 10 according to this embodiment calculates the state of each particle belonging to the same solid using the equation of motion of a rigid body. The simulation device 10 according to this embodiment defines the particles that belong to the same solid and are disposed in the sphere with the radius h, which has the particle as its center, as the same solid and calculates the state of each particle. Therefore, according to the simulation device 10 of this embodiment, even in a method which uses the equation of motion of a liquid for a liquid portion and uses the equation of motion of a rigid body for a solid portion, it is possible to perform accurate calculation.

The simulation device 10 according to this embodiment calculates the time evolution of a solid particle using the equation of motion of a rigid body. Therefore, in comparison to the case when the viscosity coefficient of a solid particle is increased and the time evolution is calculated, it is possible to further suppress an increase in the viscosity coefficient. According to the simulation device 10 of this embodiment, the time step is not reduced in calculation. In addition, according to the simulation device 10 of this embodiment, it is possible to suppress a significant increase in the number of calculation operations until calculation ends. Therefore, according to the simulation device 10 of this embodiment, it is possible to suppress a significant increase in the calculation time.

According to the simulation device 10, when there are a plurality of solids including solid particles which are other than a newly solidified particle and are within a predetermined range from the newly solidified particle, the newly solidified particle and all particles belonging to the plurality of solids are defined to as particles belonging to the same solid. Therefore, the newly solidified particle makes it possible to define all solid particles which belong to each of the plurality of solids to belong to one solid.

The simulation device 10 calculates the state of a particle which was in a solid state at the time step ($t_{ts}-1$) among a plurality of particles at the time step $t_{ts}$ after the time step ($t_{ts}-1$). Then, the simulation device 10 determines whether the particle which was in a solid state at the time step ($t_{ts}-1$) has become a liquid particle at the time step $t_{ts}$, on the basis of the state of the particle at the time step $t_{ts}$. When it is determined that the particle which was in a solid state at the time step ($t_{ts}-1$) has become a liquid particle at the time step $t_{ts}$, the simulation device 10 performs the next process. That is, the simulation device 10 defines the particle which is in a solid state at the time step ($t_{ts}-1$) and other particles in the sphere with the radius h which has the solid particle as its center among all particles belonging to the solid including the solid particle as particles belonging to the same solid. Then, the simulation device 10 calculates the state of each particle belonging to the same solid using the equation of motion of a rigid body. Therefore, according to the simulation device 10 of this embodiment, particles that belong to the same solid and are arranged in the sphere with the radius h which has a particle belonging to a solid including a newly molten liquid particle as its center are defined as the same solids and the state of each particle can be calculated. According to the simulation device 10 of this embodiment, when a particle is newly melted, a process of defining belonging is performed for the solid particles which belong to the solid including the newly molten liquid particle. Therefore, according to the simulation device 10 of this embodiment, it is possible to improve the accuracy of defining the belonging of solid particles to the solid to which the particle belonged before it is newly molted. As a result, according to the simulation device 10 of this embodiment, it is possible to calculate the state of each particle with high accuracy.

The apparatus according to the embodiment of this disclosure has been described above, but various other embodiments of the invention may be made. For example, among the processes described in the embodiment, some or all of the processes which are automatically performed may be manually performed.

Furthermore, each step described in the processes according to the embodiment may be arbitrarily divided or combined, depending on various loads or usage conditions. In addition, the steps may be omitted.

The order of the steps described in the processes according to the embodiment may be changed, depending on various loads or usage conditions.

The drawings are conceptual diagrams illustrating the functions of each component of the apparatus, and the components are not necessarily physically configured as illustrated in the drawings. That is, the detailed form of the dispersion and integration of the apparatus is not limited to that illustrated in the drawings, but some or all of the components of the apparatus may be functionally and physically dispersed and integrated in an arbitrary unit, depending on various loads or usage conditions.

Simulation Program

A computer system, such as a personal computer or a workstation, executes a program which is prepared in advance to implement the simulation process of the simulation device 10. Next, an example of a computer which executes a simulation program having the same function as the simulation device 10 will be described with reference to FIG. 13.

Figure 13:
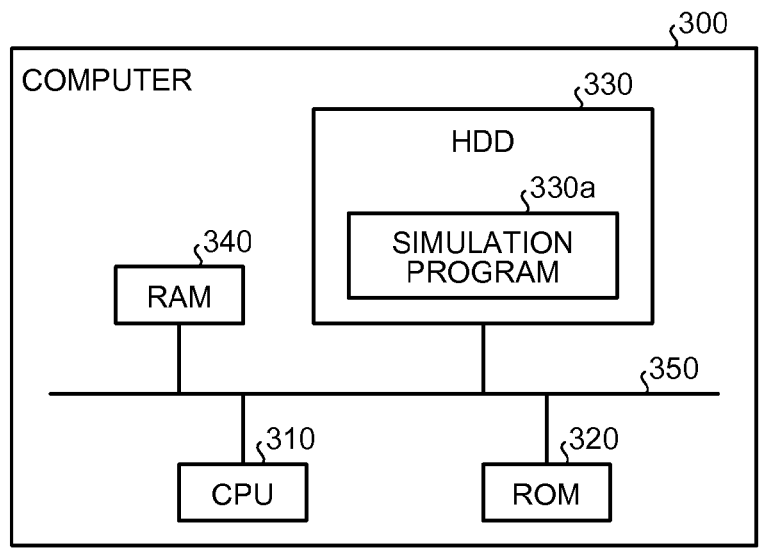
FIG. 13 is a diagram illustrating a computer which executes a simulation program.
Figure 14:
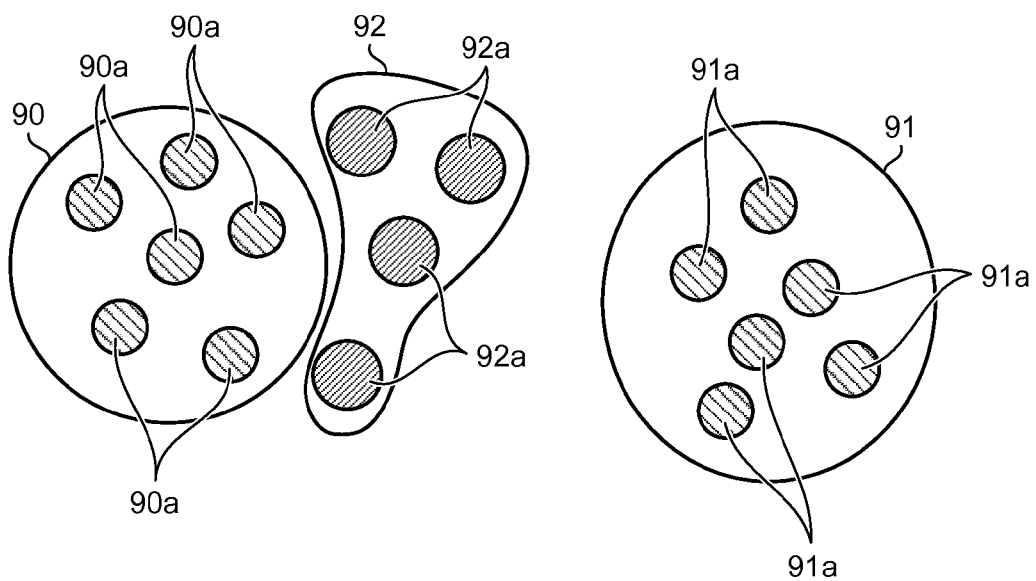
FIG. 14 is a diagram illustrating an example of the problems of a method according to the related art.

FIG. 13 is a diagram illustrating the computer which executes the simulation program. As illustrated in FIG. 13, a computer 300 includes a central processing unit (CPU) 310, a read only memory (ROM) 320, a hard disk drive (HDD) 330, and a random access memory (RAM) 340. These units 300 to 340 are connected to each other through a bus 350.

The HDD 330 stores in advance a simulation program 330a which implements the same functions as those of the calculation unit 14a, the update unit 14b, the determination unit 14c, the definition unit 14d, and the display control unit 14e. The simulation program 330a may be appropriately separated.

The CPU 310 reads the simulation program 330a from the HDD 330 and executes the simulation program 330a.

The HDD 330 stores the metal model data stored in the storage unit 13 illustrated in FIG. 2.

The CPU 310 reads data from the HDD 330 and stores the data in the RAM 340. In addition, the CPU 310 executes the simulation program 330a using various kinds of data stored in the RAM 340. Not all of the data stored in the RAM 340 may be constantly be stored in the RAM 340. Alternatively, a portion of the data which is used in the process may be stored in the RAM 340.

The simulation program 330a may not be stored in the HDD 330 from the beginning.

For example, the program is stored in a 'portable physical medium', such as a flexible disk (FD), a CD-ROM, a DVD disk, a magneto-optical disk, or an IC card, which is inserted into the computer 300. Then, the computer 300 may read the program from the portable physical medium and execute the read program.

In addition, the program is stored in 'another computer (or a server)' connected to the computer 300 through a public line, the Internet, a LAN, a WAN, or the like. Then, the computer 300 may read the program from another computer and execute the read program.

According to an aspect of an embodiment, it is possible to perform calculation with high accuracy even when a method is used which uses the equation of motion of a liquid for a liquid portion and uses the equation of motion of a rigid body for a solid portion.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable recording medium having stored therein a simulation program causing a computer to execute a process comprising:
   calculating a state of a particle which was in a liquid state at a first time among a plurality of particles at a second time after the first time when a continuum including a liquid and a solid is represented by the plurality of particles;
   determining whether the particle which was in the liquid state at the first time has become a first solid particle at the second time on the basis of the state of the particle at the second time;
   defining the first solid particle and all particles belonging to a solid which includes a second solid particle arranged in a predetermined range from the first solid particle as particles belonging to the same solid when it is determined that the particle which was in the liquid state at the first time has become the first solid particle at the second time; and
   calculating the state of each of the particles belonging to the same solid using an equation of motion of a rigid body.

2. The computer-readable recording medium according to claim 1, wherein, the defining defines, when the first solid particle and all particles belonging to the solid which includes the second solid particle are defined as the particles belonging to the same solid and there is a plurality of solids which include the second solid particle arranged in the predetermined range from the first solid particle, the first solid particle and all particles belonging to the plurality of solids which include the second solid particle as the particles belonging to the same solid.

3. The computer-readable recording medium according to claim 1, wherein the process further comprising:
   calculating a state of a particle which was in a solid state at a third time among the plurality of particles at a fourth time after the third time;
   determining whether the particle which was in the solid state at the third time has become a first liquid particle at the fourth time on the basis of the state of the particle at the fourth time;
   defining all particles belonging to a solid including the particle which was in the solid state at the third time and other particles arranged in a predetermined range of each of all particles belonging to the solid including the particle which was in the solid state at the third time as particles belonging to the same solid when it is determined that the particle which was in the solid state at the third time has become the first liquid particle at the fourth time; and
   calculating the state of each of the particles belonging to the same solid using the equation of motion of the rigid body.

4. A simulation method that causes a computer to perform:
   calculating a state of a particle which was in a liquid state at a first time among a plurality of particles at a second time after the first time when a continuum including a liquid and a solid is represented by the plurality of particles;
   determining whether the particle which was in the liquid state at the first time has become a first solid particle at the second time on the basis of the state of the particle at the second time;
   defining the first solid particle and all particles belonging to a solid which includes a second solid particle arranged in a predetermined range from the first solid particle as particles belonging to the same solid when it is determined that the particle which was in the liquid state at the first time has become the first solid particle at the second time; and
   calculating the state of each of the particles belonging to the same solid using an equation of motion of a rigid body.

5. A simulation device comprising:
   a calculation unit that calculates a state of a particle which was a liquid state at a first time among a plurality of particles at a second time after the first time when a continuum including a liquid and a solid is represented by the plurality of particles, and calculates the state of each particle belonging to the defined same solid using an equation of motion of a rigid body;
   a determination unit that determines whether the particle which was in the liquid state at the first time has become a first solid particle at the second time on the basis of the state of the particle at the second time; and a definition unit that defines the first solid particle and all particles belonging to a solid which includes a second solid particle arranged in a predetermined range from the first solid particle as particles belonging to the same solid when it is determined that the particle which was in the liquid state at the first time has become the first solid particle at the second time.

* * * * *